United States Patent Office 3,542,727
Patented Nov. 24, 1970

3,542,727
SULFUR-MODIFIED POLYMERS OF CHLOROPRENE CONTAINING BORIC ACID
Rowland Whincup Saville, Loughborough, England, assignor to E. I. du Pont de Nemours and Company, Wilmington, Del., a corporation of Delaware
No Drawing. Filed Aug. 8, 1968, Ser. No. 751,049
Claims priority, application Great Britain, Feb. 23, 1968, 8,943/68
Int. Cl. C08d 3/14, 5/02
U.S. Cl. 260—45.7      4 Claims

ABSTRACT OF THE DISCLOSURE

Initial rapid decline heretofore experienced in the polymer viscosity of sulfur-modified polymers of chloroprene upon aging is inhibited by adding to the polymer, after termination of its preparatory polymerisation reaction, about from 0.3 to 1.0 part of boric acid per 100 parts of polymer.

BACKGROUND OF THE INVENTION

The term neoprene, as used herein, includes polymers prepared from chloroprene (2-chloro-1,3-butadiene) alone or with minor amounts (less than 50%) of at least one monomer, containing olefinic unsaturation, which is co-polymerisable with the chloroprene, including compounds containing the group

for example, aromatic compounds such as styrene, vinyl toluenes and vinyl naphthalenes, acrylic and methacrylic acids and derivatives thereof such as esters and nitriles, e.g., methyl methacrylate and acrylonitrile, and conjugated diolefinic compounds such as 1,3-butadiene, isoprene and 2,3-dichloro-1,3-butadiene.

The so-called "sulphur-modified" neoprenes are believed to be chloroprene-sulphur copolymers, the sulphur being present in the polymer chain in the form of sulphide linkages.

Such neoprenes show a variation in polymer viscosity with aging and the most common form of viscosity variation is an initial rapid decline in polymer viscosity.

SUMMARY

According to the present invention there is provided a process for the preparation of sulphur-modified neoprenes having improved stability which includes the step of adding boric acid to a sulphur-modified neoprene after the polymerisation reaction in which the sulphur-modified neoprene is prepared is terminated.

The boric acid should be added in an amount which will at least reduce the extent of the reaction in polymer viscosity over, say, the first month after manufacture. Preferably no more than about 1% by weight (based on the dry weight of neoprene) of boric acid is added to the polymer since further additions have not shown a significant further improvement in viscosity stability of the polymer. Generally a minimum amount of 0.3% by weight of boric acid is added to the polymer and advantageous results have been obtained within the range of 0.3–1.0% of boric acid based on the weight of polymer.

DESCRIPTION OF THE PREFERRED EMBODIMENTS

The sulphur-modified neoprene can be prepared in the usual manner—for example, by the aqueous dispersion technique described in British patent specification Nos. 807,496 and 1,044,847 in the latter of which an aqueous emulsion of chloroprene containing from 0.25 to 0.45%, expressed as percentage of monomer weight, of sulphur is polymerised at about 40° C. and the polymerisation is terminated when the desired degree of polymerisation has been attained. Unpolymerised monomer is stripped from the resulting aqueous dispersion and the polymer can be isolated and dried in any convenient manner, e.g., by drum-drying or freeze coagulation followed by drying. The boric acid can either be added to the polymer before or after unpolymerised monomer is stripped out from the aqueous dispersion or to the isolated polymer.

The boric acid can be added in solid form or as an aqueous solution taking care to avoid coagulation of the aqueous dispersion.

In order that the invention may be well understood the following examples wherein all parts and percentages, unless otherwise stated, are by weight are given by way of illustration only:

The sulphur-modified neoprene latices employed in Examples 1 through 4 were prepared as follows:

Polymer A.—A monomer solution of 100 parts of chloroprene, 4.0 parts of a disproportionated wood rosin and 0.55 part of sulphur and a water solution of 96.6 parts of water, 2.5 parts of ammonia (100% basis), 0.17 part of potassium hydroxide, 0.2 part of sodium lauryl sulphate and 0.01 part of potassium sulphite were mixed together to form an emulsion. The emulsion was heated to 40° C. and the chloroprene was polymerised by adding 0.03 part of ammonium persulphate and 0.01 part of 2-anthraquinone sodium sulphonate as an aqueous solution. When the monomer conversion reached 88% the polymerisation was stopped by adding 0.01 part of phenothiazine, 0.01 part of 2,5-di-t-butyl hydroquinone and 2.00 parts of tetraethyl thiuram disulphide dissolved in 2.69 parts of toluene dispersed in 2.67 parts of water containing 0.10 part of the potassium salt of a disproportionated rosin. The unreacted monomer and other volatile components were removed by steam stripping in a turbannular stripper at 150 mm. pressure and the resulting neoprene latex was treated with 0.48 part of dimethyl ammonium dimethyldithiocarbamate for 2–6 hours at 25–40° C.

Polymer B.—Polymer B is prepared by a process similar to that described for Polymer A except that 98 parts of chloroprene and 2 parts of 2,3-dichloro-1,3-butadiene are used as co-monomers.

Examples 1–3 illustrate the changes in Mooney viscosities which occurred on storage of Polymer A at different temperatures whilst Example 4 shows the change in Mooney viscosity of a sample of Polymer B after being stored at 50° C. for 19 days.

EXAMPLE 1

A 5% aqueous solution of boric acid was added, in the quantities indicated (weights being based on the weight of dry polymer), to the latex of Polymer A after the polymerisation was terminated. The addition was accompanied by stirring to ensure homogeneous mixing into the aqueous dispersion and the product was isolated as a dry polymer by pouring the latex into the nip between the rolls of a double drum dryer heated with steam at 150 p.s.i. and rotating at 12–25 r.p.m. to evaporate the water. Mooney viscosities of the polymer which had been aged over a number of months at 25° C. were measured.

The Mooney viscosities were measured by ASTM Method D–1646–63.

| Percent boric acid | Original Mooney viscosity | Mooney viscosity after X months at 25° C. | | | |
|---|---|---|---|---|---|
| | | 1 month | 2 months | 3 months | 6 months |
| 0 | 52.5 | 52 | 41 | 45.5 | 37.5 |
| 0.3 | 53 | 48 | 51.5 | 51.5 | 47 |
| 0.5 | 55.5 | 53.5 | 56 | 58.5 | 54 |
| 0.7 | 58.0 | 52 | 55.5 | 57.5 | 51.5 |

EXAMPLE 2

Example 1 was repeated except that the polymer was aged at 38° C. before the Mooney viscosity measurements were taken.

| Percent boric acid | Original Mooney viscosity | Mooney viscosity after X months at 25° C. | | | |
|---|---|---|---|---|---|
| | | 1 month | 2 months | 3 months | 6 months |
| 0 | 52.5 | 38 | 33.5 | 37 | 44.5 |
| 0.3 | 53 | 48.5 | 48 | 50.5 | 50 |
| 0.5 | 55.5 | 55.5 | 57 | 58 | 55 |
| 0.7 | 58.0 | 54.5 | 60 | 62 | 58 |

EXAMPLE 3

Example 1 was repeated except that the polymer was aged at 50° C. before the Mooney viscosity measurements were taken.

| Percent boric acid | Original Mooney viscosity | Change in Mooney viscosity after 21 days at 50° C. |
|---|---|---|
| 0 | 52.5 | −17.5 |
| 0.3 | 53 | −8 |
| 0.5 | 55.5 | −3.5 |
| 0.7 | 58.0 | −1.5 |

EXAMPLE 4

Example 1 was repeated using polymer B in place of polymer A, polymer B being aged at 50° C. for 19 days.

| Percent boric acid | Original Mooney viscosity | Change in Mooney viscosity after 21 days at 50° C. |
|---|---|---|
| 0 | 47 | −16 |
| 0.1 | 50 | −13 |
| 0.3 | 54.5 | −6½ |
| 0.5 | 55.5 | −3½ |
| 1.0 | 60 | −3 |

EXAMPLE 5

100 parts of chloroprene having dissolved therein 0.6 part of sulphur and 4 parts of wood resin are emulsified in a solution of 0.75 part of sodium hydroxide and 0.5 part of the sodium salt of the condensation product of formaldehyde and naphthalene sulfonic acid in 122.5 parts of water. A catalyst solution is prepared by dissolving 0.50 part of potassium persulfate and 0.025 part of the sodium salt of anthraquinone beta-sulfonic acid in 9.47 parts of water. Polymerisation of the chloroprene emulsion is carried out at 40° C. by adding to it, while agitating, a part of the catalyst solution at the start and the balance in increments during the polymerisation to maintain a fairly uniform rate of polymerisation. The course of the polymerisation is followed by the change in specific gravity of the emulsion.

The polymerisation is stopped when the specific gravity at 40° C. reaches 1.072, corresponding to 90% conversion of the monomer, by adding a "short-stop" composition prepared by dissolving 0.02 part of 4,4′-thiobis(6-tert. butyl-o-cresol) and 0.45 part of tetraethyl thiuram disulfide in 2.95 parts of toluene and dispersing this solution in 2.22 parts of water containing 0.30 part of the sodium salt of the condensation product of formaldehyde and naphthalene sulfonic acid.

The dispersion is cooled rapidly to 30° C. and 0.37 part of sodium dibutyl dithiocarbamate dissolved in water is added with further cooling to 25° C. The emulsion is kept at this temperature for 4 hours during which the polymer is plasticized. The unreacted chloroprene is removed by steam distillation at reduced pressure by the procedure of U.S. 2,467,769. Then 1.6 parts of tetraethyl thiuram disulfide dispersed in water, as above, is added and dilute acetic acid is added to reduce the pH of the emulsion to 5.8. The polymer is then isolated by the freeze-roll process of U.S. 2,187,146 and washed and dried.

100 parts of the polymer is mixed on a mill with 0.5 part of boric acid. A similar control sample of 100 parts is given the same milling treatment without the addition of boric acid. Pellets for determining Mooney viscosity are formed from each and aged at 50° C. The Mooney viscosities determined after 1, 2 and 4 weeks are shown in the following table.

| Time | Mooney viscosity | |
|---|---|---|
| | Control | Boric acid added |
| Initial | 42.0 | 40.5 |
| 1 week | 34 | 42.5 |
| 2 weeks | 34 | 39.5 |
| 4 weeks | 33.5 | 41.a |

What I claim is:

1. An unvulcanized sulfur-modified polymer of chloroprene prepared by polymerizing chloroprene in an aqueous emulsion in the presence of from 0.25 to 0.6%, expressed as percentage of monomer weight, of sulfur, said polymer containing about from 0.3 to 1.0 part of boric acid per 100 parts of polymer.

2. A composition of claim 1 in which the polymer is a copolymer of chloroprene and sulphur.

3. A composition of claim 1 in which the polymer is a copolymer of chloroprene and 2,3-dichloro-1,3-butadiene and sulphur.

4. A composition of claim 1 in which the proportion of boric acid is about from 0.3 to 0.7 part per 100 parts of polymer.

References Cited

UNITED STATES PATENTS

| 3,105,055 | 9/1963 | Aho | 260—30.8 |
| 3,198,760 | 8/1965 | Widenor | 260—27 |
| 3,235,532 | 2/1966 | Hopper et al. | 260—45.95 |
| 3,321,435 | 5/1967 | Fritz et al. | 260—45.7 |
| 3,378,538 | 4/1968 | Sparks | 260—92.3 |

DONALD E. CZAJA, Primary Examiner

R. A. WHITE, Assistant Examiner

U.S. Cl. X.R.

260—79, 92.3